United States Patent [19]
Sotoyanagi et al.

[11] Patent Number: 5,463,771
[45] Date of Patent: Oct. 31, 1995

[54] IMAGE DATA FILING SYSTEM COMPRISING OF AN OPTICAL DISK LIBRARY AND A DISK ARRAY

[75] Inventors: Osamu Sotoyanagi, Iwate; Yoshinori Okami, Odawara; Naoya Takahashi, Yokohama, all of Japan

[73] Assignee: Hitachi, Ltd., Tokyo, Japan

[21] Appl. No.: 911,029

[22] Filed: Jul. 9, 1992

[30] Foreign Application Priority Data

Jul. 12, 1991 [JP] Japan ................................ 3-172617

[51] Int. Cl.⁶ .......................... G06F 13/00; G06F 11/14
[52] U.S. Cl. .................. 395/600; 395/438; 395/441; 395/182.04; 364/DIG. 1; 364/282.1; 364/283.1; 364/285
[58] Field of Search ................... 395/600, 425, 395/145, 147, 118, 600, 575; 364/DIG. 1

[56] References Cited

U.S. PATENT DOCUMENTS 4,879,655  11/1989  Akatsuka ................. 364/413.02
4,907,188  3/1990  Suzuki et al. ................. 395/200

*Primary Examiner*—Thomas G. Black
*Assistant Examiner*—Jean R. Homere
*Attorney, Agent, or Firm*—Meltzer, Lippe, Goldstein

[57] ABSTRACT

An electronic file equipment which duplicates stocked image data and which permits the image data to be accessed at high speed. Using a console, an operator instructs a control device to register an optical disk housed in an optical disk library. The control device reads image data stored in the pertinent optical disk through an optical disk library I/O control unit, and stores the read image data in a disk array through a disk array I/O control unit. In addition, information which indicates the corresponding relation between the pertinent optical disk and the image data stored in the disk array is generated and is stored in the disk array along with the image data.

7 Claims, 20 Drawing Sheets

FIG. 4

| LABEL INFORMATION STORING START POINT | LABEL INFORMATION STORING END POINT | MEDIUM TYPE | MEDIUM IDENTIFIER |
|---|---|---|---|
| 311 | 312 | 313 | 314 |

F I G. 5

| LABEL NAME | REGISTRATION DATE | REGISTRATION TIME | NUMBER OF TIMES OF REFERENCE | TITLE INFORMATION STORING START POINT | TITLE INFORMATION STORING END POINT | TITLE INFORMATION STORING CURRENT POINT | IMAGE DATA STORING START POINT | IMAGE DATA STORING END POINT | IMAGE DATA STORING CURRENT POINT | NUMBER OF TIMES OF WRITING |
|---|---|---|---|---|---|---|---|---|---|---|
| 3201 | 3202 | 3203 | 3204 | 3205 | 3206 | 3207 | 3208 | 3209 | 3210 | 3211 |

FIG. 6

| RETRIEVAL INFORMATION | PAGES | IMAGE DATA START POINT | IMAGE DATA SIZE | REGIST-RATION DATE | REGIST-RATION TIME |
|---|---|---|---|---|---|
| 331 | 332 | 333 | 334 | 335 | 336 |

FIG. 11

CAPACITY OF DISK ARRAY :　　16 MB

USED AREA OF DISK ARRAY :　　13 MB

EMPTY AREA OF DISK ARRAY : 5" OPTICAL DISK : SIDE 10

F I G. 12

| MEDIUM IDENTIFIER | LABEL NAME | NUMBER OF TIMES OF REFERENCE | REGISTRATION DATE | REGISTRATION TIME | STOCKED STATUSES | | MEDIUM TYPE |
|---|---|---|---|---|---|---|---|
| | | | | | RETRIEVAL INFORMATION | IMAGE DATA | |
| FILE | HITACHI | 10 | 90-10-1 | 11 : 50 | PRESENT | ABSENT | OPTICAL DISK |
| FILE | TOKYO | 9000 | 91-1-1 | 16 : 30 | PRESENT | PRESENT | OPTICAL DISK |
| SCRAP | OSAKA | 7999 | 91-1-1 | 12 : 00 | PRESENT | PRESENT | OPTICAL DISK |

FIG.13

| LABEL NAME | RETRIEVAL INFORMATION | IMAGE DATA |
|---|---|---|
| Ⓐ | AGREEMENT | AGREEMENT |
| Ⓑ | AGREEMENT | DISAGREEMENT |
| Ⓒ | -------- | -------- |

FIG. 17

| LABEL NAME | TITLE INFORMATION STORING START POINT | TITLE INFORMATION STORING END POINT | TITLE INFORMATION STORING CURRENT POINT | UPDATED COUNT |
|---|---|---|---|---|
| A | ... | ... | ... | ... |
| B | ... | ... | ... | ... |
| ( FFFF ) | — | — | — | — |
| ( FFFF ) | | | | |

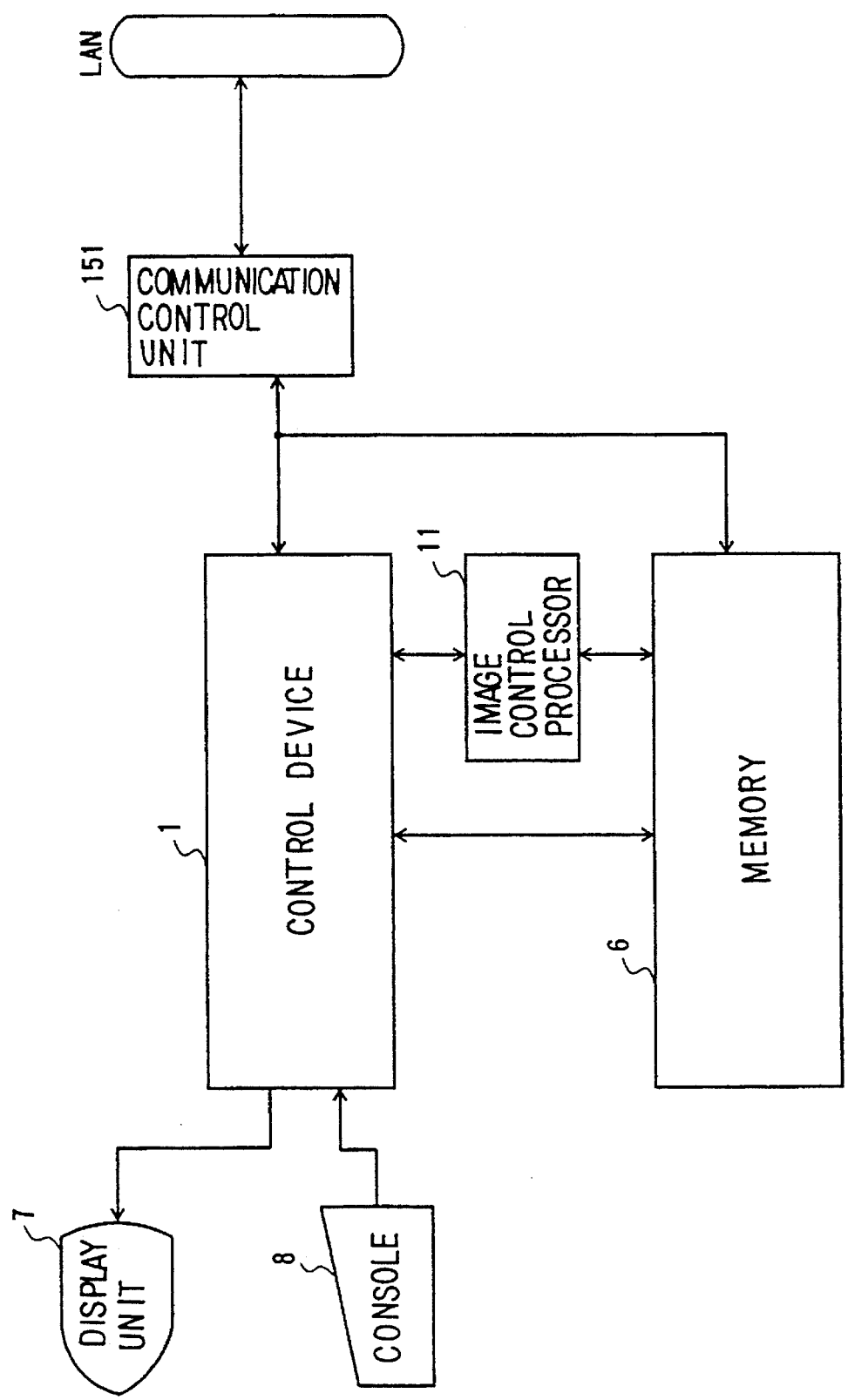

IMAGE DATA FILING SYSTEM COMPRISING OF AN OPTICAL DISK LIBRARY AND A DISK ARRAY

BACKGROUND OF THE INVENTION

1. Field of the Invention

The present invention relates to an electronic file equipment. More particularly, it relates to an electronic file equipment adapted to access image data at high speed.

2. Description of the Related Art

An electronic file equipment for electronically stocking image information has been known from, for example, the disclosure of the official gazette of Japanese Patent Application Laid-open No. 186362/1987.

In such a prior-art electronic file equipment, the image information items are recorded in an optical disk. Besides, a recording medium which stores management information for managing the image information recorded in the optical disk is disposed separately from this optical disk, thereby to decrease the time needed for retrieval.

Especially in case of stocking a large quantity of image information, the image information items are recorded in an optical disk library. The optical disk library is a device in which a plurality of optical disks are housed, and in which the optical disk can be mounted on a disk drive as need be so as to be accessed. In this case, it is common to further dispose a magnetic disk device which stores management information for managing the images recorded in the optical disks housed in the optical disk library.

In the case of using the optical disk library, the large quantity of image information can be stocked. In this case, however, time periods for mounting the optical disk on the disk drive and removing it therefrom are necessitated. Accordingly, the image information cannot be accessed at high speed.

Moreover, with the prior art stated above, when the optical disk becomes damaged, by way of example, the image information items recorded in this optical disk are lost, and they cannot be recovered. That is, the prior-art equipment is not always very highly reliable.

SUMMARY OF THE INVENTION

Therefore, the present invention has for its object to provide an electronic file equipment which can stock a large quantity of image information with a high reliability and in which the image information can be accessed at high speed.

In order to accomplish the object, the present invention provides an electronic file equipment for stocking image data, comprising (a) a library in which a plurality of image storage media storing image data are housed, (b) a disk array which stores image data therein, (c) a control device which controls the library and the disk array, (d) a console which accepts instructions from an operator, and (e) an image output device which outputs an image represented by image data. The control device includes registration device to perform read control of the image data stored in the image storage media housed in the library, and control of writing this image data into the disk array. The registration device also generates information relating the image data with the image storage medium from which it has been read, and controls the writing of the generated information into the disk array. The control device further includes playback control device to perform control of reading out the image data stored in the disk array in relation to the specified image medium when the console has accepted an instruction to play back the image data of the specified image medium, on the basis of information on the specified image data as stored in the disk array, and also controls outputting of the image represented by the image data read out of the disk array, through the image output device.

In operation, according to the electronic file equipment of the present invention, the image data stored in the image storage medium housed in the library is read, and the read image data is registered in the disk array by bringing this data into correspondence with the image storage medium storing it, so that the image data is duplicated to enhance the reliability of data storage. Moreover, since the disk array can be accessed at a higher speed as compared with the library, image information items registered in the disk array can be quickly accessed.

In addition, the image data items stored in one or more image storage media are registered in the disk array by bringing them into correspondence with the image storage media storing them, so that any desired one of the image storage media registered in the disk array can be taken out of the library so as to be utilized in another electronic file equipment. Besides, in such a case where the image data registered in the disk array is to be edited or renewed or where new image data is to be stored, the operation can be carried out quickly for the disk array, and the pertinent image data can be thereafter recorded in the corresponding image storage medium at any desired time.

BRIEF DESCRIPTION OF THE DRAWINGS

FIG. 4 is an explanatory diagram showing the format of medium management information in the disk array according to the first embodiment of the present invention;

FIG. 5 is an explanatory diagram showing the format of label information in the disk array according to the first embodiment of the present invention;

FIG. 6 is an explanatory diagram showing the format of title information in the disk array according to the first embodiment of the present invention;

FIG. 11 is an explanatory diagram showing a display example of the registration state information of the disk array according to the first embodiment of the present invention;

FIG. 12 is an explanatory diagram showing a display example of the used situation information of the disk array according to the first embodiment of the present invention;

FIG. 13 is an explanatory diagram showing a display example of conformance information for the stored data items of the disk array and the image storage medium of the optical disk library according to the first embodiment of the present invention;

FIG. 17 is an explanatory diagram showing the organization of an automatic backup table for use in the automatic backup process for the image data according to the embodiment of the present invention;

FIG. 20 is a block diagram showing the construction of a retrieval apparatus according to the second embodiment of the present invention.

DETAILED DESCRIPTION OF THE PREFERRED EMBODIMENTS

Now, the first embodiment of an electronic file equipment according to the present invention will be described.

Figure 1:
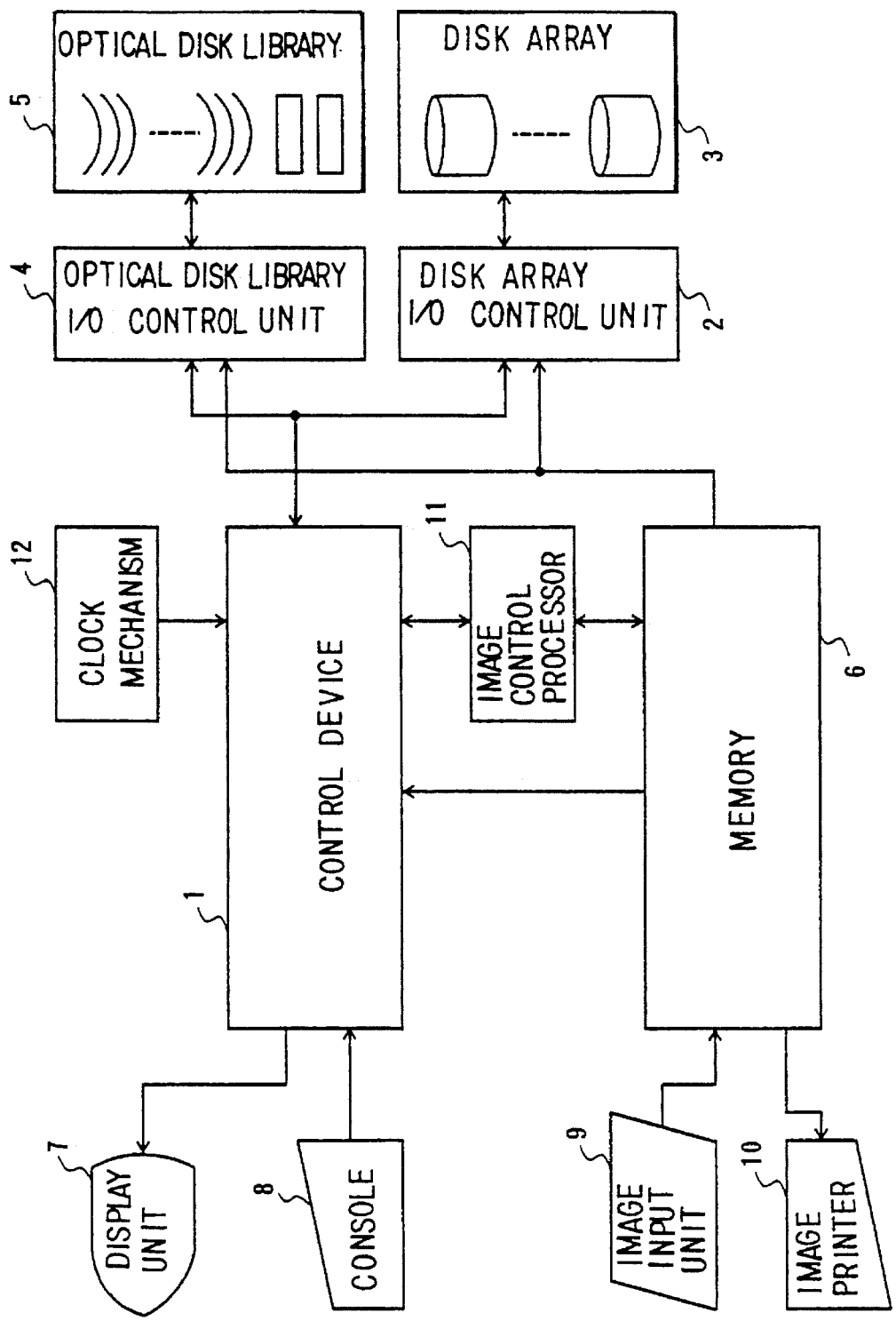
FIG. 1 is a block diagram showing the construction of an electronic file equipment according to the first embodiment of the present invention.

FIG. 1 shows the construction of the electronic file equipment in the first embodiment.

As illustrated in the figure, the electronic file equipment in the first embodiment is constructed of a control device 1, a disk array input/output control unit 2, a disk array 3, an optical disk library input/output control unit 4, an optical disk library 5, a memory 6, a display unit 7, a console 8, an image input unit 9, an image printer 10, an image control processor 11, and a clock mechanism 12.

Figure 2:
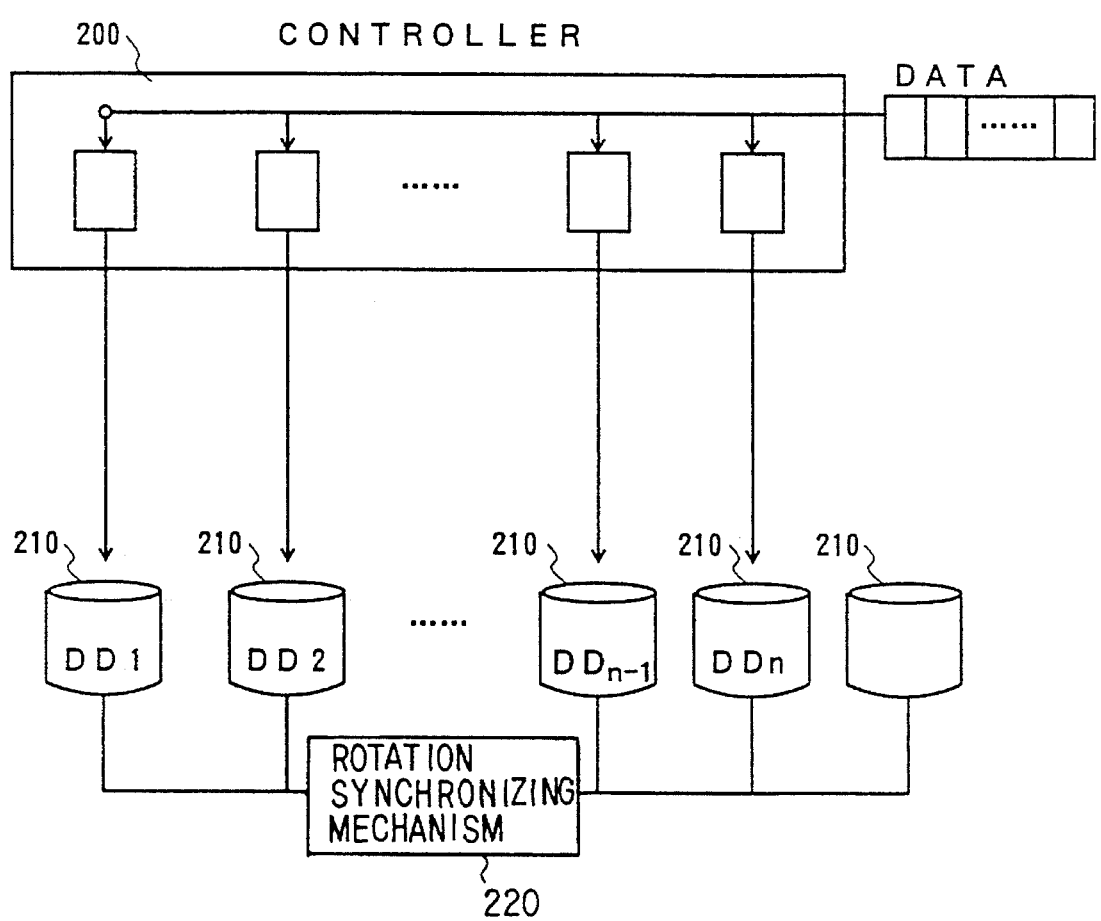
FIG. 2 is a block diagram showing the configuration of a disk array.

As shown in FIG. 2, the disk array 3 includes a controller 200 and a plurality of magnetic disk devices 210 and rotation synchronizing mechanism 220. Herein, a plurality of magnetic disk of a plurality of disk devices are accessed in parallel, whereby data are recorded or played back in parallel to attain a higher operating speed. The rotation synchronizing mechanism 220 controls the respective magnetic disk devices to cause the magnetic disks to rotate in synchronization.

The optical disk library 5 houses a plurality of optical disks therein. If necessary, the optical disk is mounted on a drive and is accessed.

The control device 1 performs the controls of the whole electronic file equipment.

The disk array I/O control unit 2 controls the input/output operations of the disk array 3 under the commands of the control device 1. More specifically, it governs the input/output of image data between the disk array 3 and the memory 6, the input/output of retrieval information between the control device 1 and the disk array 3, and so forth.

On the other hand, the optical disk library I/O control unit 4 controls the input/output operations of the optical disk library 5 under the commands of the control device 1. More specifically, it governs the input/output of retrieval information between the optical disk library 5 and the control device 1, and the input/output of image data between the optical disk library 5 and the memory 6.

The image control processor 11 encodes the bit map data of image information temporarily held in the memory 6. The encoded data is registered in the disk array 3 through the disk array I/O control unit 2. Herein, the encoded data can also be registered in the optical disk library 5 through the optical disk library I/O control unit 4.

In addition, the image control processor 11 develops image data read out of the disk array 3 through the disk array I/O control unit 2, as a bit map in the memory 6. Further, the image control processor 11 can develop image data read out of the optical disk library 5 through the optical disk library I/O control unit 4, as a bit map in the memory 6.

The display unit 7 displays control information or the image of the bit map developed in the memory 6, under the control of the control device 1.

The console 8 delivers instructions accepted from the operator of the electronic file equipment, to the control device 1.

The image input unit 9 includes an image scanner or the like. It reads an image from an original, and develops the bit map of the read image in the memory 6.

The image printer 10 prints out the image of the bit map developed in the memory 6.

The clock mechanism 12 keeps time.

Next, a method of storing image data in the disk array 3 will be described.

In this embodiment, image data items are managed as follows: First, the image data items are entitled every page or every plurality of pages. In addition, the image data items are divided into groups, to which unique labels are respectively affixed.

Figure 3:
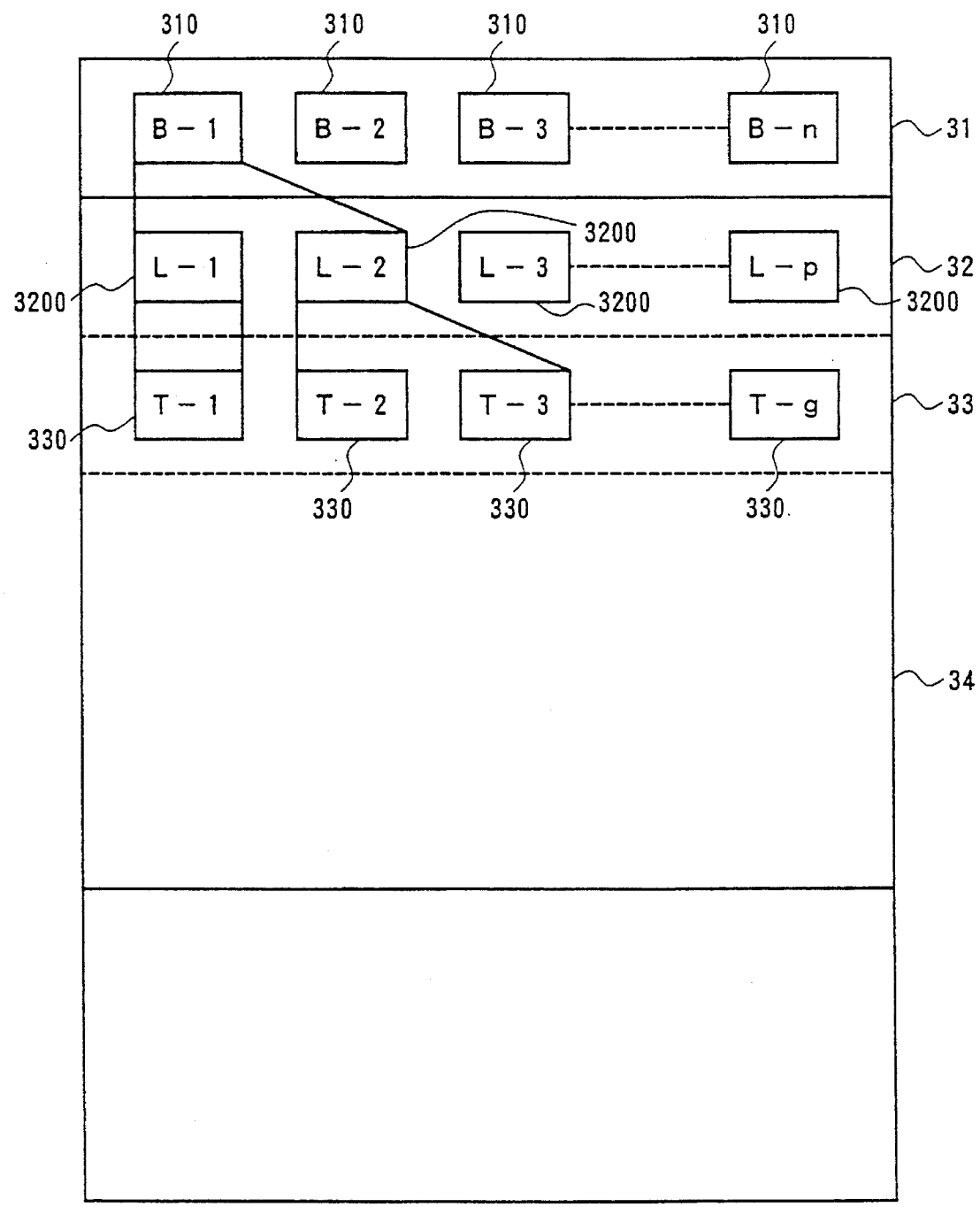
FIG. 3 is an explanatory diagram showing the storage form of the disk array according to the first embodiment of the present invention.

FIG. 3 illustrates the configuration of stored data in the disk array 3.

As shown in the figure, an image data field 34, a title information field 33, a label information field 32 and a medium management information field 31 are separately defined in the data area of the disk array 3.

The image data field 34 stores image data. The title information field 33 stores title information items 330 which are information on the titles of the image data stored in the image data field 34. The label information field 32 stores label information items 3200 which are information on the labels of the image data stored in the image data field 34.

Stored in the medium management information field 31 are information items 310 (B-1~B-n) for individual image storage medium units. The image storage medium unit information items 310 are contained in correspondence with, at least, image storage medium units included in the optical disk library 5. Here, the expression "image storage medium unit" is intended to mean a unit which can be accessed without the operation of mounting or removing a storage medium on or from a drive, in a recorder such as the optical disk library or a magnetic tape device. More specifically, the unit is one record surface of the optical disk in the optical disk library or one roll of magnetic tape in the magnetic tape device.

In a case where any external storage device is connected to the electronic file equipment in order to store images, image storage medium unit information items 310 are further contained in correspondence with image storage medium units for use in the connected external storage device. By way of example, in a case where the magnetic tape device is connected as the external storage device for the image storage, the number of image storage medium unit information items 310 contained will equal the number of rolls of magnetic tape for use in the magnetic tape device, in addition to the number of the record surfaces of the image storage media included in the optical disk library 5.

Here in the first embodiment, the image data items stored in the optical disk library 5 and the external storage device are also stored in the disk array 3 in duplicative fashion. In the disk array 3, the image data items are stored by bringing them into correspondence with the image storage medium units in which they are stored. The correspondence between the stored image data of the disk array 3 with the image storage medium units of the optical disk library 5 and the external storage device are described in the image storage medium unit information items 310.

The format of the image storage medium unit information items 310 (B-1~B-n) is shown in FIG. 4.

As shown in the figure, each of the image storage medium unit information items 310 (B-1~B-n) is formed of a label information storing start point 311, a label information storing end point 312, a medium type 313 and a medium identifier 314.

The medium type 313 indicates the type of the image storage medium (optical disk or magnetic tape) which includes the image storage medium unit corresponding to the particular image storage medium unit information 310. The medium identifier 314 indicates the identifier of the image storage medium.

The label information storing start point 311 indicates the start address of that area in the disk array 3 which can store the label information 3200 on the image data stored in the disk array 3 in correspondence with the image storage medium unit corresponding to the particular image storage medium unit information 310.

The label information storing end point 312 indicates the end address of that area in the disk array 3 which can store the label information 3200 of the image data stored in the disk array 3 in correspondence with the image storage medium unit corresponding to the particular image storage medium unit information 310.

Next, the format of the label information 3200 is shown in FIG. 5.

Each of the label information items 3200 (L-1~L-p) is formed of a label name 3201, a registration date 3202, a registration time 3203, the number of times of reference 3204, a title information storing start point 3205, a title information storing end point 3206, a title information storing current point 3207, an image data storing start point 3208, an image data storing end point 3209, an image data storing current point 3210 and the number of times of writing 3211.

The registration date 3202 and the registration time 3203 indicate the day and hour respectively when the pertinent label information 3200 was registered in the disk array 3. The number of times of reference 3204 indicates the number of times which the image data bearing the pertinent label was accessed.

The title information storing start point 3205 indicates the start address of that area in the disk array 3 which can store the title information 330 on the image data bearing the pertinent label. The title information storing end point 3206 indicates the end address of that area in the disk array 3 which can store the title information 330 on the image data bearing the pertinent label. The title information storing current point 3207 indicates the end address of an area having already stored the title information, within that area in the disk array 3 which can store the title information 330.

The image data storing start point 3208 indicates the start address of that area in the disk array 3 which can store the image data bearing the pertinent label. The image data storing end point 3209 indicates the end address of that area in the disk array 3 which can store the image data bearing the pertinent label. The image data storing current point 3210 indicates the end address of an area having already stored the image data, within that area in the disk array 3 which can store the image data. The number of times of writing 3211 indicates the number of times which the image data was written into the pertinent label in the disk array 3.

Next, the format of the title information 330 is shown in FIG. 6.

The title information field 33 in FIG. 3 stores the title information items 330 (T-1~T-q). As shown in FIG. 6, each of the title information items 330 (T-1~T-q) is formed of retrieval information 331, pages 332, an image data start point 333, an image data size 334, a registration date 335 and a registration time 336.

Registered as the retrieval information 331 is a title or the like which the operator designates in order to fetch the image data. The pages 332 indicate the number of image pages which are contained in the image data corresponding to the title information 330. The image data start point 333 indicates the start address of that area in the disk array 3 in which the image data corresponding to the particular title information 330 is stored. The image data size 334 indicates the size of the image data. The registration date 335 and the registration time 336 indicate the day and hour respectively when the image data corresponding to the particular title information 330 was registered.

Figure 7:
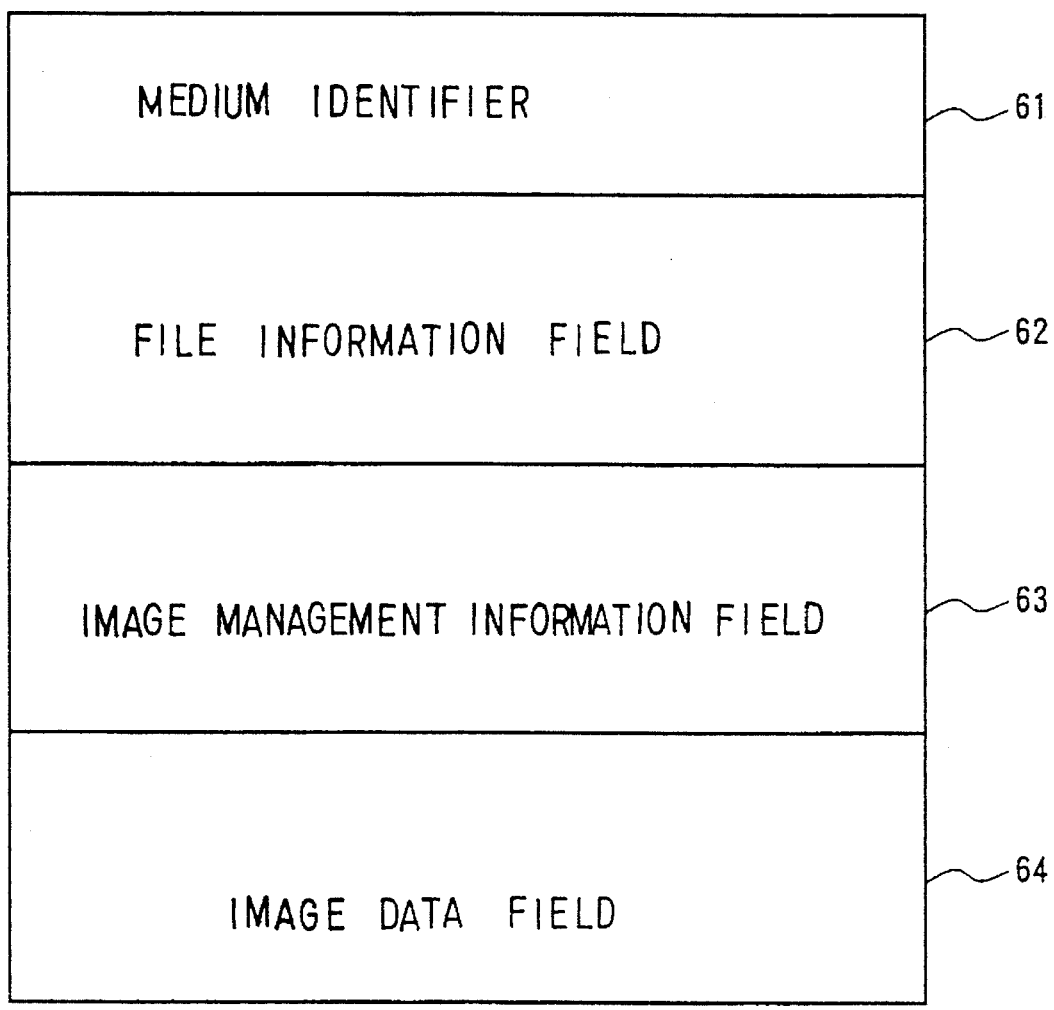
FIG. 7 is an explanatory diagram showing the storage form of an image storage medium housed in an optical disk library according to the first embodiment of the present invention.

Next, the configuration of each image storage medium in the optical disk library 5 is illustrated in FIG. 7.

The image storage medium is divided into a plurality of areas for storing image data items. Each divisional area is called a "file".

As shown in the figure, a medium identifier field 61, a file information field 62, an image management information field 63 and an image data field 64 are separately defined in the image storage medium housed in the optical disk library 5.

A unique identifier given to the image storage medium is registered in the medium identifier field 61. The file information field 62 stores file information in correspondence with each file. The file information has a configuration similar to that of the label information 3200.

The image management information field 63 stores image management information in correspondence with each image data item. The image management information has a configuration similar to that of the title information 330.

More specifically, the file information contains the name of a label affixed to the corresponding file, a registration date, information on the image management information corresponding to the image data in the file, and so forth.

The image management information contains retrieval information, a registration date, a registration time, address information on the corresponding image data, and so forth.

In this manner, the record formats of the disk array and those of the image storage media are made the same in the first embodiment. This measure is taken to facilitate holding the corresponding relations between the data items of the image storage media and those of the disk array. Also, it facilitates the transfer of data to-be-written between the image storage medium and the disk array.

Now, the operations of the electronic file equipment according to the first embodiment will be outlined.

In the first place, the operation of registering an image into the electronic file equipment of the first embodiment will be described.

First, there will be referred to a case where image data stored in an optical disk is to be registered into the electronic file equipment.

In this case, the optical disk is inserted into the optical disk library 5. Subsequently, using the console 8, the operator instructs the control device 1 to register the optical disk housed in the optical disk library 5. Also, he/she instructs the control device 1 to register the recorded image data of the optical disk into the disk array 3. On this occasion, however, the process for registering the optical disk need not be performed if the optical disk has already been registered.

In compliance with the instruction of registering the optical disk, the control device 1 generates the image storage medium unit information 310 corresponding to this optical disk in the medium management information field 31. Also, in compliance with the instruction of registering the image data, the control device 1 reads the stored image data of the optical disk through the optical disk library I/O control unit 4. Subsequently, the control device 1 stores the read image data in the disk array 3 through the disk array I/O control unit 2.

Next, there will be referred to a case where an image is to be registered from an original into the electronic file equipment.

In this case, using the console 8, the operator instructs the image input unit 9 to input the image.

The image input unit 9 reads the image and generates image data. The image data is temporarily stored in the memory 6. Then, the image control processor 11 functions to display the image indicated by the image data temporarily stored in the memory 6, on the display unit 7.

In addition, the image data temporarily stored in the memory 6 is turned into a compressed code, which is registered into the disk array 3 through the disk array I/O control unit 2.

Besides, in registering the image data into the disk array 3, the retrieval information 331 which is bestowed on the image data to-be-registered is input from the console 8. Then, the control device 1 generates the label information 3200 and the title information 330 in accordance with the input retrieval information and the date and time of the clock mechanism 12, and it registers the generated information items.

Secondly, the operation of playing back image data registered in the disk array 3 will be described.

The retrieval information 331 is first input from the console 8.

The control device 1 fetches the image data endowed with the same retrieval information as the input retrieval information 331, from the disk array 3. Subsequently, it decodes and expands the fetched image data and stores the resulting data in the memory 6. Further, it controls the display unit 7 so as to display the image indicated by the image data stored in the memory 6.

Meanwhile, when the control device 1 is instructed from the console 8 to print the image displayed on the display unit 7, it functions to send the stored image data of the memory 6 to the image printer 10, which prints out the sent data on paper.

Now, the registering operation and the playing-back operation stated above will be detailed.

First, there will be described the operation of registering image data stored in an optical disk, into the disk array 3 anew.

Figure 8:
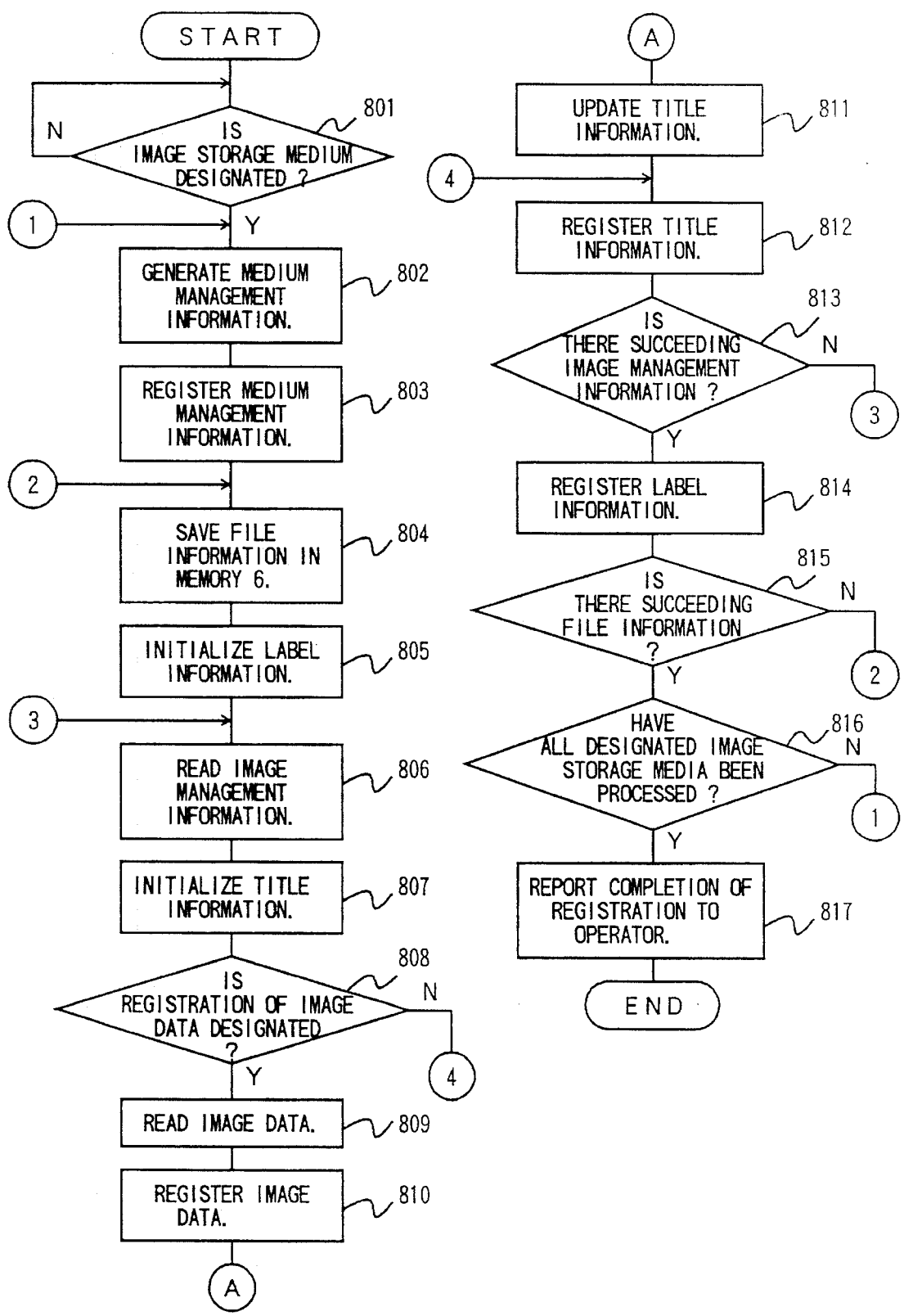
FIG. 8 is a flow chart showing a process for registering image data from the optical disk library into the disk array according to the first embodiment of the present invention.

FIG. 8 illustrates the processing steps of the registering operation.

As shown in the figure, the control device 1 instructed by the operator to register the optical disk into the disk array 3 functions first to read the medium identifiers 61 of all the optical disks housed in the optical disk library 5, through the optical disk library I/O control unit 4. Subsequently, it controls the display unit 7 so as to display all the read medium identifiers. Further, it awaits the designation of the optical disk to-be-registered (step 801).

Upon the designation of the optical disk, the control device 1 generates the image storage medium unit information 310 of the medium identifier of the designated medium, and stores it in the memory 6 (step 802).

Then, the image storage medium unit information 310 stored in the memory 6 is registered into the medium management information field 31 in the disk array 3 (step 803).

At the next step, the control device 1 saves one of the file information items contained in the file information fields 62 generated for the image storage media, in the memory 6 (step 804). Then, the label information 3200 is generated and stored in the memory 6 on the basis of the file information already saved in the memory 6 (step 805).

The generation of the label information 3200 proceeds as follows:

First, the label name 3201 is extracted from the file information saved in the memory 6. The registration date 3202 is determined by referring to the clock mechanism 12. The registration time 3203 and the number of times of reference 3204 have their values set to 0 (zero). The image data storing start point 3208 and the image data storing end point 3209 are set in conformity with the size of the area capable of storing the image data as indicated by the file information. Then, the image data storing current point 3210 is rendered the same value as the set value of the image data storing start point 3208. Besides, the title information storing start point 3205 and the title information storing end point 3206 are set in conformity with the size of the area capable of storing the image management information as indicated by the file information. Then, the title information storing current point 3207 is rendered the same value as the set value of the title information storing start point 3205.

Thereafter, the image management information indicated by the file information saved before is read from the image management information field 63 of the optical disk (step 806). Subsequently, the title information 330 is generated and stored in the memory 6 on the basis of the image management information already saved in the memory 6 (step 807).

The generation of the title information 330 proceeds as follows:

First, the retrieval information 331 is extracted from the image management information read from the optical disk and is set in the title information 330. Subsequently, the value of the pages 332 is set to 0 (zero). Besides, the value of the image data storing current point 3210 contained in the label information 3200 generated at the step 805 is set as the image data start point 333. In addition, the value of the image data size 334 is set to 0 (zero). Further, the registration date 335 and the registration time 336 are extracted from the image management information read from the optical disk and are set in the title information 330.

At the next step, whether or not the registration of the image data into the disk array 3 is instructed together with the registration of the optical disk is checked (step 808). Owing to the decision of this step, the embodiment is also permitted to register only the identification data of the optical disk.

In a case where the registration of the image data is instructed, the image data of the image data field 64 in the image storage medium is loaded into the memory 6 (step 809). Then, the loaded image data is registered into the image data field 34 in the disk array 3 (step 810). The registration is started from an address indicated by the image data start point 333 contained in the title information 330 stored in the memory 6.

After the registration of the image data, the value of the pages 332 of the title information 330 stored in the memory 6 is set on the basis of the image management information already saved in the memory 6, and the size of the image data registered in the image size 324 is set (step 811).

Subsequently, the title information 330 stored in the memory 6 is registered into the title information field 33 in the disk array 3 (step 812). The registration of the title information 330 is started from an address appointed by the title information storing current point 3207 contained in the generated label information 3200.

After the registration of the title information 330, the values of the title information storing current point 3207 and the image data storing current point 3210 which are contained in the label information 3200 stored in the memory 6 are updated.

Incidentally, in a case where the registration of the recorded image data of the optical disk into the disk array 3 is not instructed, only the processing of the step 812 is executed.

After the above registration processing has been done, the routine returns to the processing step 806, and the next image management information item contained in the identical file is read so as to execute the processing described above (step 813).

When the processing for all the image management information items indicated by the saved file information has been completed, the registration time 3203 of the label information 3200 previously stored in the memory 6 is set. Subsequently, the label information 3200 is registered into the label information field 32 in the disk array 3 (step 814).

Further, the above processing is executed for the next file information stored in the optical disk (step 815).

When the processing for all the file information items stored in the optical disk has been completed, whether or not the registrations of a plurality of optical disks are instructed is checked (step 816). Herein, in a case where the registrations of the plurality of optical disks are instructed, the routine returns to the step 802, and the processing is executed for the next optical disk (steps 802–815).

When all the designated optical disks have been processed, the control device 1 reports the completion of the registrations to the operator (step 817) and awaits the next instruction (step 801).

Secondly, the operation of registering an image from an original into the disk array 3 will be described.

Figure 9:
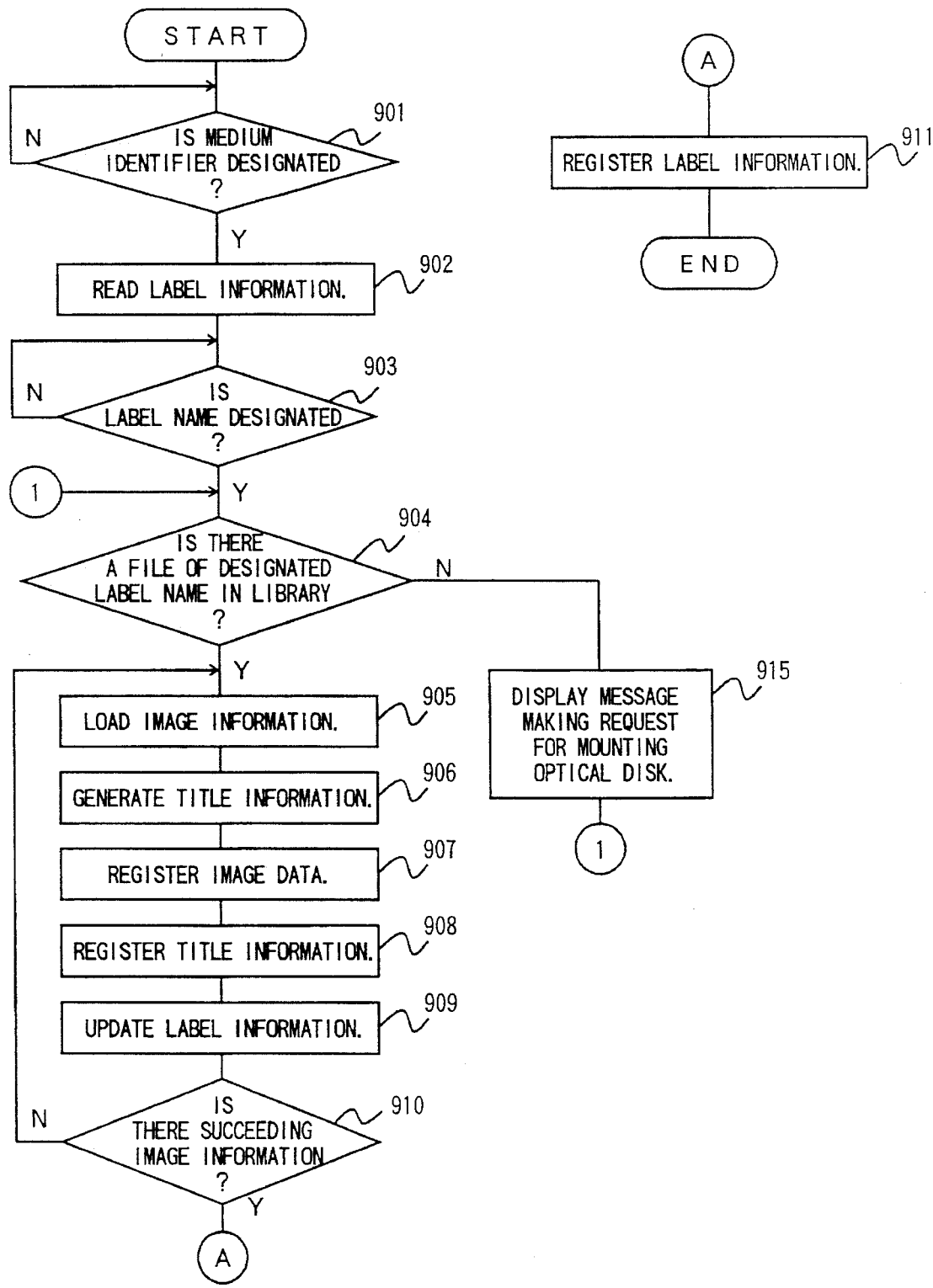
FIG. 9 is a flow chart showing a process for registering image data from an original image into the disk array according to the first embodiment of the present invention.

FIG. 9 illustrates processing steps in this case.

When the control device 1 is instructed from the console 8 to register the image of the original, it reads the contents of the medium management information fields 31 of the disk array 3. Subsequently, it controls the display unit 7 so as to display all the read medium identifiers 314 registered in the medium management information fields 31. Further, it awaits the designation of a medium in which the image of the original is to be recorded (step 901).

When the medium identifier of the medium for storing the image is designated, the control device 1 searches the medium management information fields 31 for the image storage medium unit information items 310 each of which has the designated medium identifier as the medium identifier 314. Subsequently, it reads out the label information items 3200 corresponding to the designated medium identifier, from the label information fields 32 in accordance with the label information storing start point 311 and label information storing end point 312 of each of the image storage medium unit information items 310 searched for. Then, the label information items 3200 read out are temporarily stored in the memory 6 (step 902).

At the next step, the label names 3201 are respectively extracted from the label information items 3200 temporarily stored in the memory 6 and are displayed on the screen of the display unit 7. Then, the control device 1 awaits the designation of the label name of a label for the registration of the image (step 903).

Upon the designation of the label name of the label for the registration of the image, the control device 1 checks whether or not a file having the designated label name is stored in the optical disk library 5 (step 904). Herein, in a case where the file is not stored, the display of a request for mounting an optical disk which stores the file bearing the pertinent label name is presented on the display unit 7 (step 915). On the other hand, in a case where the file of the designated label name is stored in the optical disk library 5, the number of times of reference 3204 contained in the label information 3200 of the designated label name as loaded in the memory 6 is updated. In addition, the control device 1 controls the image input unit 9 so as to read the image. The image data of the image read by the image input unit 9 is temporarily stored in the memory 6. Besides, the image control processor 11 functions to display an image indicated by the image data temporarily stored in the memory 6, on the display unit 7 (step 905).

At the next step, the title information 330 is generated and stored in the memory 6 as stated below.

First, the input of a title for retrieval is accepted from the console 8. The accepted title is written as the retrieval information 331. Subsequently, the number of pages of the input image is set in the pages 332. Besides, the same value as that of the image data storing current point 3210 of the label information 3200 of the designated label name as loaded in the memory 6 is set in the image data start point 333. Also, the size of the input image data is set in the image data size 334. Then, the registration date 335 and the registration time 336 are set by referring to the clock mechanism 12 (step 906).

Subsequently, the image data loaded in the memory 6 is written into both the optical disk library 5 and the disk array 3 in duplicative fashion. In the optical disk library 5, the image data is written into the file having the designated label name. On the other hand, in the disk array 3, the image data is written from the image data start point 333 contained in the title information 330 stored in the memory 6 (step 907).

Thereafter, the image management information on the pertinent image is generated on the basis of the title information 330 generated and stored in the memory 6 and is registered into the image management information field 63 of the optical disk. In addition, the generated title information 330 is registered into the title information field 33 of the disk array 3 (step 908). The registration of the title information 330 is started from the title information storing current point 3207 of the label information 3200 of the designated label name loaded in the memory 6.

Subsequently, the contents of the title information storing current point 3207 and image data storing current point 3210 of the label information 3200 of the designated label name loaded in the memory 6 are updated (step 909).

In a case where the registration of an image succeeds, the routine returns to the step 905 for the image data read processing again, and the processing for registering the next image is continued (step 910).

When all images have been registered in due course, the file information is generated on the basis of the label information 3200 generated and stored in the memory 6 and is written into the file information field 62 of the optical disk having the designated medium identifier 61. Besides, the label information 3200 is registered into the label information field 32 of the disk array 3 (step 911).

Now, the operation of playing back an image registered in the disk array 3 will be described in detail.

Figure 10:
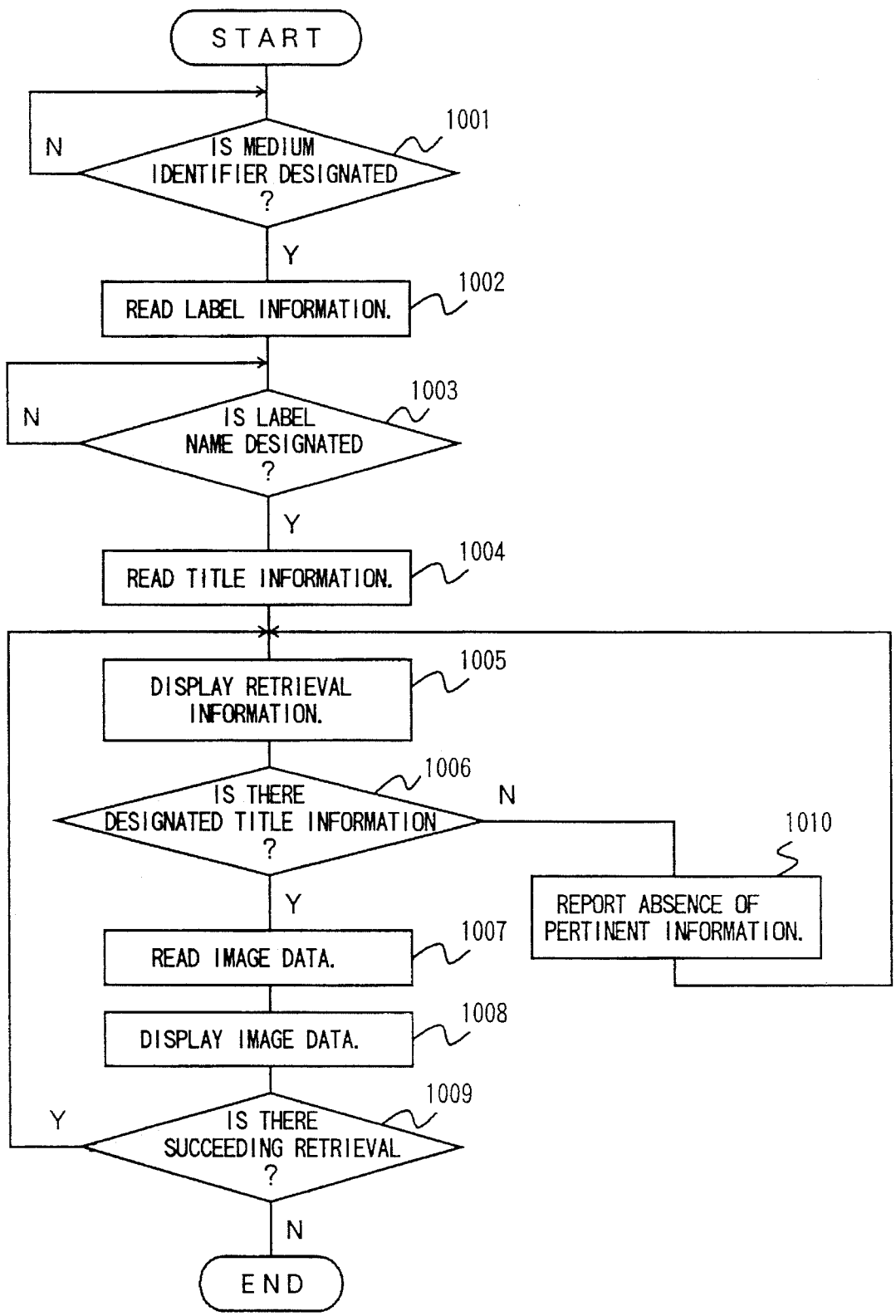
FIG. 10 is a flow chart showing a process for retrieving image data registered in the disk array according to the first embodiment of the present invention.

FIG. 10 illustrates the steps of this process.

When instructed from the console 8 to retrieve the image, the control device 1 reads the contents of the image storage medium unit information items 310 of the medium management information fields 31 from the disk array 3. Subsequently, it controls the display unit 7 so as to display the read medium identifiers 314. Then, it awaits the designation of a medium identifier (step 1001).

Upon the designation of the medium identifier from the console 8, the control device 1 reads from the label information fields 32 of the disk array 3 the label information items 3200 which are specified by the label information storing start points 311 and label information storing end points 312 of the image storage medium unit information items 310 each having the designated medium identifier as the medium identifier 314. Then, the read label information items 3200 are temporarily stored in the memory 6 (step 1002).

At the next step, the control device 1 extracts the label names 3201 from the label information items 3200 stored in the memory 6 and controls the display unit 7 so as to display them. Then, it awaits the designation of a label name (step 1003).

Upon the designation of the label name, the control device 1 reads from the title information fields 33 of the disk array 3 the title information items 330 which are specified by the title information storing start points 3205 and title information storing current points 3207 of the label information items 3200 each having the designated label name as the label name 3201. The read title information items 330 are temporarily stored in the memory 6 (step 1004). Besides, the contents of the retrieval information items 331 of the title information items 330 stored in the memory 6 are displayed on the screen of the display unit 7 (step 1005).

Then, the control device 1 awaits the input of the information to-be-retrieved.

When the information to-be-retrieved is input, the control device 1 seeks the title information 330 which has the input retrieval information as the retrieval information 331 (step 1006).

In the absence of the retrieval information corresponding to the input retrieval information, a display to the effect that no corresponding title information 330 exists is presented on the display unit 7 (step 1010).

In the presence of the title information 330 corresponding to the input retrieval information, image data is read from that area of the image data field 34 of the disk array 3 which is specified by the image data start point 333 and image data size 334 of the corresponding title information 330 (step 1007).

The read image data is temporarily stored in the memory 6. Besides, the image control processor 11 functions to display an image indicated by the image data stored in the memory 6, on the display unit 7 (step 1008).

In a case where another item of information to be retrieved is successively input, the routine returns to the retrieval information display processing at the step 1005, and the above processing steps are reiterated (step 1009). In contrast, in a case where no item of information to be retrieved is successively input, the process is ended.

Incidentally, since a process for renewing an image registered in the disk array 3 is similar to the foregoing process for registering the image of an original (refer to FIG. 9), it shall be omitted from all description.

Meanwhile, the electronic file equipment according to the first embodiment notifies the operator of the stocked situation of images in the disk array 3 in compliance with the request from the operator.

The notification is effected by displaying disk array registration state information on the screen of the display unit 7.

FIG. 11 shows the disk array registration state information which is displayed on the display unit 7.

As shown in the figure, the disk array registration state information contains the capacity of the disk array, the used area of the disk array and the empty area of the disk array. The capacity of the disk array indicates the total capacity of the disk array 3. The used area of the disk array indicates a capacity which has already been used for registering images. This capacity already used for registering images can be evaluated by adding up the sizes of areas from the image data storing start points 3208 to the image data storing end points 3209, for all the label information items 3200 registered in the disk array 3.

The empty area of the disk array indicates those areas capable of storing image data which remain in the disk array 3, in terms of the number of optical disks. This empty area of the disk array can be evaluated in such a way that an area obtained by subtracting the capacity already used, from the capacity of the disk array 3, is divided by the capacity of each optical disk. Although the empty area is calculated in relation to 5-inch optical disks in the illustration of FIG. 11, it may well be calculated in relation to 12-inch optical disks or the likes in accordance with the sort of the optical disks employed in the optical disk library 5.

Besides, in the case where the magnetic tape device is utilized for storing images, the empty area may well be indicated in terms of the number of rolls of magnetic tape.

In this manner, according to the electronic file equipment of the first embodiment, it is possible to confirm the capacity of the disk array 3 and to know the registrable state of the disk array 3.

In this regard, the following aspect of operation may well be performed: At the point in time, for example, at which a new optical disk has been housed in the optical disk library 5, the remaining capacity of the disk array 3 is evaluated as stated above, and whether or not the contents of the optical disk housed anew can be registered into the disk array 3 is decided. If the contents can be registered, the foregoing process for registering the image data of an image storage medium (refer to FIG. 8) is started without intervening the instruction of the operator, whereby the image data items of the new optical disk are registered into the disk array 3.

Moreover, the electronic file equipment according to the first embodiment displays the information items of labels registered in the disk array 3, in compliance with the request of the operator.

FIG. 12 shows the information items which are displayed.

As shown in the figure, the information items of each label contain a medium identifier, a label name, the number of times of reference of the label, a registration date, a registration time, stocked statuses and a medium type.

The medium identifier indicates the identifier of a medium in which a file corresponding to the pertinent label is stored. The medium type indicates the type of medium in which the file corresponding to the pertinent label is stored. The label information items are generated as follows:

First, the image storage medium unit information items 310 are successively loaded from the disk array 3, and the medium identifiers 314 as well as the medium types 313 are extracted therefrom.

For each of the medium identifiers 314, the label information items 3200 which are specified by the label information storing start points 311 and label information storing end points 312 of the image storage medium unit information items 310 are loaded, and the label names 3201 are extracted therefrom. The label names indicate the names of the labels.

Subsequently, the number of times of reference to the label, the registration date and registration time of the label, and the stocked statuses of the label are derived for each of the label names.

The number of times of reference to the label indicates the number of times which the pertinent label was referred to, and it is derived from the number of times of reference 3204 contained in the corresponding label information 3200. The registration date indicates the day on which the pertinent label was registered, and it is derived from the registration date 3202 of the corresponding label information 3200. The registration time indicates the hour at which the pertinent label was registered, and it is derived from the registration time 3203 of the corresponding label information 3200. The stocked statuses indicate whether retrieval information is present or absent in the label, and whether image data is present or absent in the label. The presence or absence of the retrieval information can be found by comparing the title information storing start point 3205 and title information storing current point 3207 of the corresponding label information 3200. The presence or absence of the image data can be found by comparing the image data storing start point 3208 and the image data storing current point 3210 of the corresponding label information 3200.

Thus, all the information items have been obtained. They are rearranged for the individual label names, and are displayed in a form shown in FIG. 12.

Moreover, the electronic file equipment according to the first embodiment displays the agreement or disagreement between the contents of the label in the disk array 3 and that file of the optical disk in the optical disk library 5 to which the same label is affixed, on the screen of the display unit 7 in compliance with the request of the operator.

The state of this display is illustrated in FIG. 13.

As shown in the figure, the information of the agreement or disagreement is displayed for each of retrieval information and image data.

The agreement or disagreement of the retrieval information is found for each label name in such a way that the size of an area from an address indicated by the title information storing start point 3205 of the label information 3200, to an address indicated by the title information storing current point 3207 thereof, is compared with the size of an image management information storing area indicated in the file information.

On the other hand, the agreement or disagreement of the image data is found for each label name in such a way that the size of an area from an address indicated by the image data storing start point 3208 of the label information 3200, to an address indicated by the image data storing current point 3210 thereof, is compared with the size of an image data area indicated in the file information.

Meanwhile, in the foregoing embodiment, in the case of reading an image from an original and registering image data into the disk array 3, the same image data is registered into the optical disk library 5 simultaneously with the registration into the disk array 3 (refer to FIG. 9).

The registration of the image data into the optical disk library 5, however, may well be separately done after the registration into the disk array 3.

By way of example, such image data items may well be registered into the optical disk library 5 collectively every fixed time period or collectively in compliance with the instruction of the operator. Alternatively, when such image data items to be registered into the optical disk library 5 have reached a predetermined quantity, they may well be registered collectively.

Accordingly, as an example of the process for collectively registering image data items in this manner, there will now be described a process for collectively registering written image data items into the optical disk library 5, for labels whose image data items were written a predetermined number of times or more. Hereinbelow, the registration of the image data items into the optical disk library 5 adopting this process shall be termed "automatic backup".

First of all, the organization of an automatic backup table for use in this process is illustrated in FIG. 17.

As shown in the figure, the automatic backup table has the items of a label name 1701, a title information storing start point 1702, a title information storing end point 1703, a title information storing current point 1704 and an updated count 1705.

The number of times of writing 3211 contained in the label information 3200 (refer to FIG. 5) is used for this process.

That is, in reading an image from an original and registering image data into the disk array 3, the number of times of writing contained in the label information of a label whose image is to be registered is updated in advance.

Then, when the automatic backup is executed, the process to be described below is carried out.

Incidentally, this process is started every fixed period in the control device 1. Alternatively, it is started in compliance with the instruction of the operator.

Figure 14:
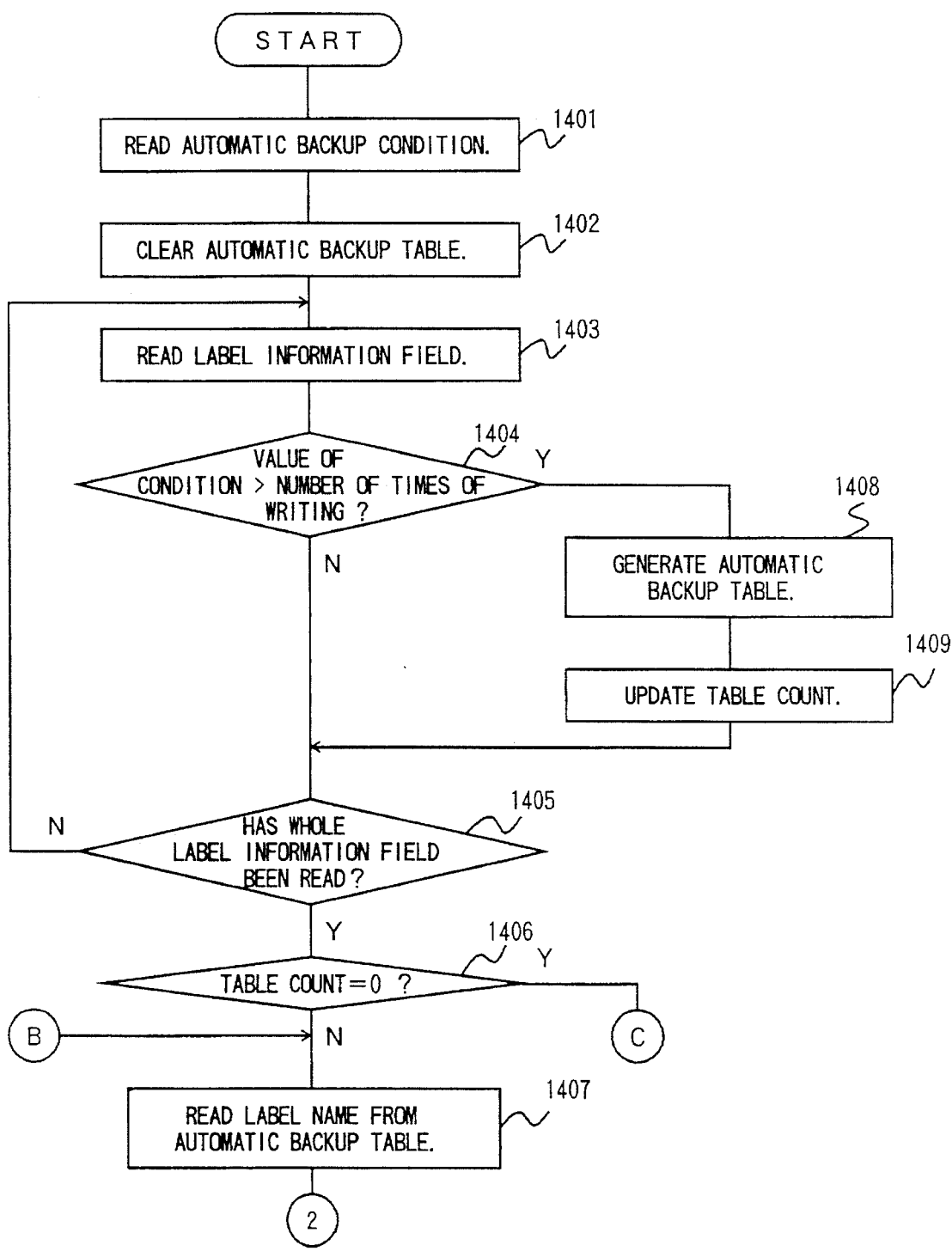
FIG. 14 is a flow chart showing an automatic backup process for image data according to an embodiment of the present invention.

When the process is started, a preset automatic backup condition is first read for the process (step 1401 in FIG. 14). The automatic backup condition is that smallest number of times of writing of the image data which the label for the automatic backup ought to satisfy, as stated before.

At the next step, the automatic backup table is cleared. The operation of clearing the automatic backup table is effected by, for example, making all data items in the table equal to "FFFF" (step 1402).

The label information items (3200 in FIG. 3) are successively read (step 1403). Subsequently, the number of times of writing 3211 contained in each of the label information items 3200 is compared with the automatic backup condition value read before (step 1404).

In a case where the number of times of writing 3211 is smaller, the relevant label is not the subject of the automatic backup, and hence, the process shifts to the succeeding label (step 1405).

On the other hand, in a case where the number of times of writing 3211 is greater, the automatic backup table concerning the relevant label is generated (step 1408). More specifically, the label name 3201, title information storing start point 3205, title information storing end point 3206 and title information storing current point 3207 which are contained in the label information 3200 are respectively copied as the label name 1701, title information storing start point 1702, title information storing end point 1703 and title information storing current point 1704 of the automatic backup table. In addition, the number of the title information items 330 registered in an area from the title information storing start point 3205 to the title information storing current point 3207 is counted, and it is registered into the item of the updated count in the automatic backup table.

Subsequently, a table count which indicates the number of labels registered in the automatic backup table is updated (step 1409).

When the above processing steps have been executed for all the label information items (step 1405), the value of the table count is checked, and the process is ended in accordance with the checked value of 0 (zero) (step 1406). The reason therefor is that no label exists as the subject of the automatic backup.

Thenceforth, the routine shifts to a process for registering the labels registered in the automatic backup table, into the optical disk library 5.

Figure 15:
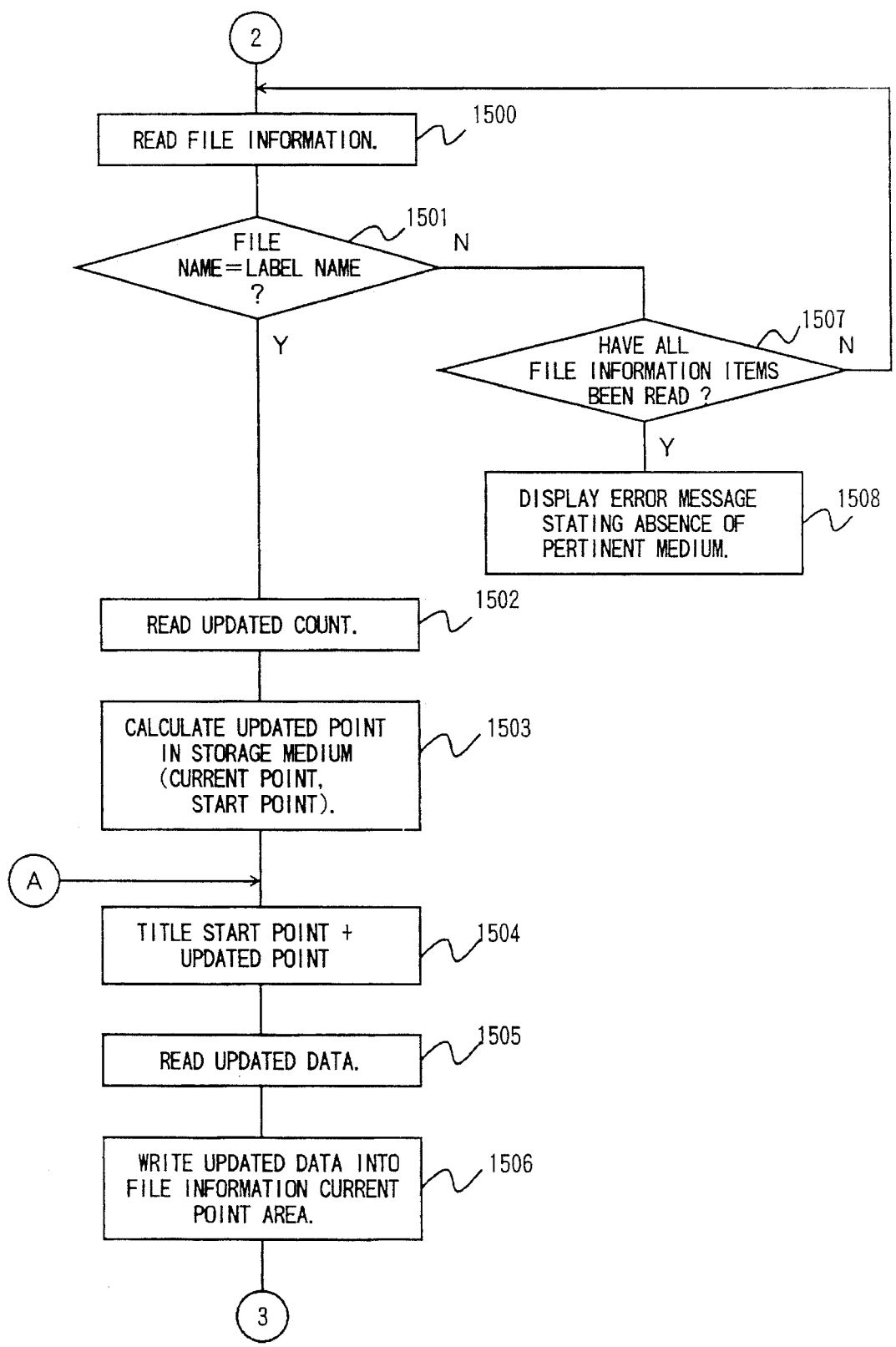
FIG. 15 is a flow chart showing the automatic backup process for the image data according to the embodiment of the present invention.

First, the registered label names are successively read from the automatic backup table (step 1407). Next, the file information items are successively read from the file information fields 62 of each optical disk housed in the optical disk library 5, and whether or not a file name in each of tile file information items agrees with the label names read from the automatic backup table before is decided (steps 1500, 1501 in FIG. 15).

In the absence of any file agreeing with the label name, it means that the optical disk whose image data is to be registered by the automatic backup has been taken out of the optical disk library 5. Therefore, the operator is notified to that effect by displaying an error message on the display unit 7 (steps 1507, 1508).

Figure 16:
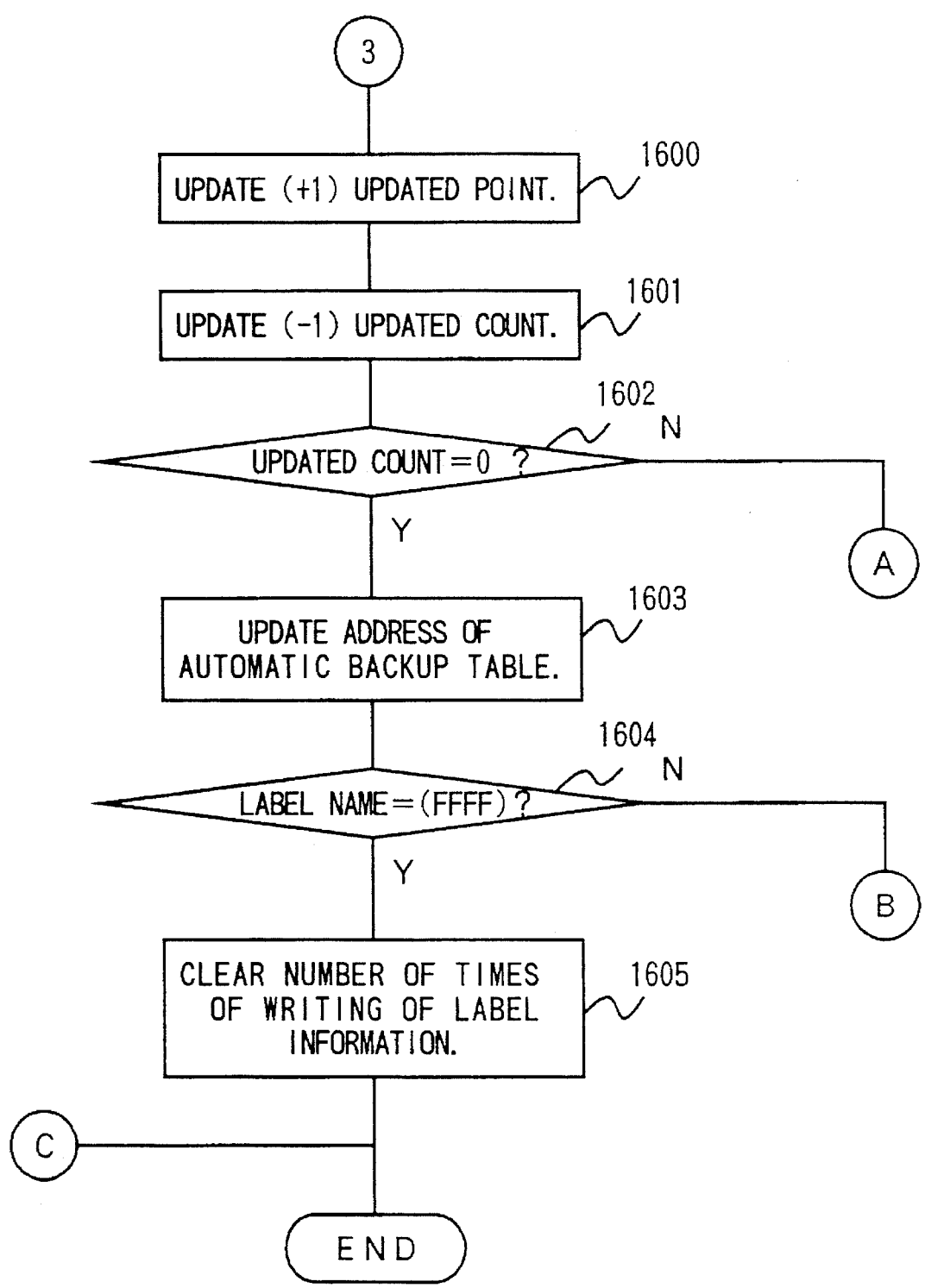
FIG. 16 is a flow chart showing the automatic backup process for the image data according to the embodiment of the present invention.

In a case where the file name agrees with the label name, the number of the title information items 330 registered in the area between the title information storing start point and title information storing current point of the agreeing file information is counted, and the number of the image management information items is counted, so as to store updated points (steps 1502, 1503). Further, among the title information items of the image data items within the label of the disk array 3, those registered in a part outside the obtained updated point, and the image data items corresponding thereto are successively derived while the updated points and the updated counts are being updated. The updated data items of the files having agreed with the label name are transferred to the optical disk library 5 (steps 1504, 1505, 1506 in FIG. 15, and steps 1600, 1601, 1602 in FIG. 16).

Thenceforth, the above processing for registering the image data into the optical disk library 5 is executed for all the labels registered in the automatic backup table (steps 1603, 1604). When the processing is over, the number of times of writing contained in each of the label information items which are the subjects of the automatic backup is set to 0 (zero) (step 1605), and the whole process is ended.

Incidentally, in the above process, the image data items having already been stored in the optical disk before the automatic backup are assumed to be not renewed or deleted in the disk array 3, and only the image data items added anew in the disk array 3 are processed as the subjects of the automatic backup.

However, in a case where the image data items having already been stored in the optical disk before the automatic backup might be renewed or deleted in the disk array 3, all the image data items and title information items in the labels being the subjects of the automatic backup may well be transferred to the optical disk library 5 so as to register them in substitution for the data items having already been stored in the optical disk.

Meanwhile, the optical disk library 5 is not limited in the quantity of data to-be-handled owing to the interchangeability of the optical disks, whereas the disk array 3 is limited in its storage capacity.

Accordingly, it may occur that all the image data items to be handled in the optical disk library 5 cannot be stored in the disk array 3. In such a case, it is unfavorable that the image data items which are less frequently referred to are kept stored in the disk array 3.

In this embodiment, therefore, the image data items which have the number of times of reference 3204 in their label information 3200 below a predetermined value are written back into the optical disk. Besides, the registrations of the information items and image data items concerning the labels written back are canceled from the disk array 3.

The writing-back process can be realized in such a way that, in the automatic backup process stated before, the comparison between the number of times of writing and the conditional value at the step 1404 is replaced with the comparison between the number of times of reference and the conditional value, whereby the label to be written back is determined.

This writing-back process may be started by the operator on the basis of the display of the capacity of the disk array (FIG. 11). Alternatively, it may be started when the calculated empty area of the disk array has become smaller than a predetermined value. Further, it may well be started automatically every fixed period.

Incidentally, in the case where the writing-back process or the automatic backup process is started every fixed period, it should preferably be started at a time such as in the night when the system is not being fully utilized.

Now, an electronic file system according to another embodiment of the present invention will be described.

Figure 18:
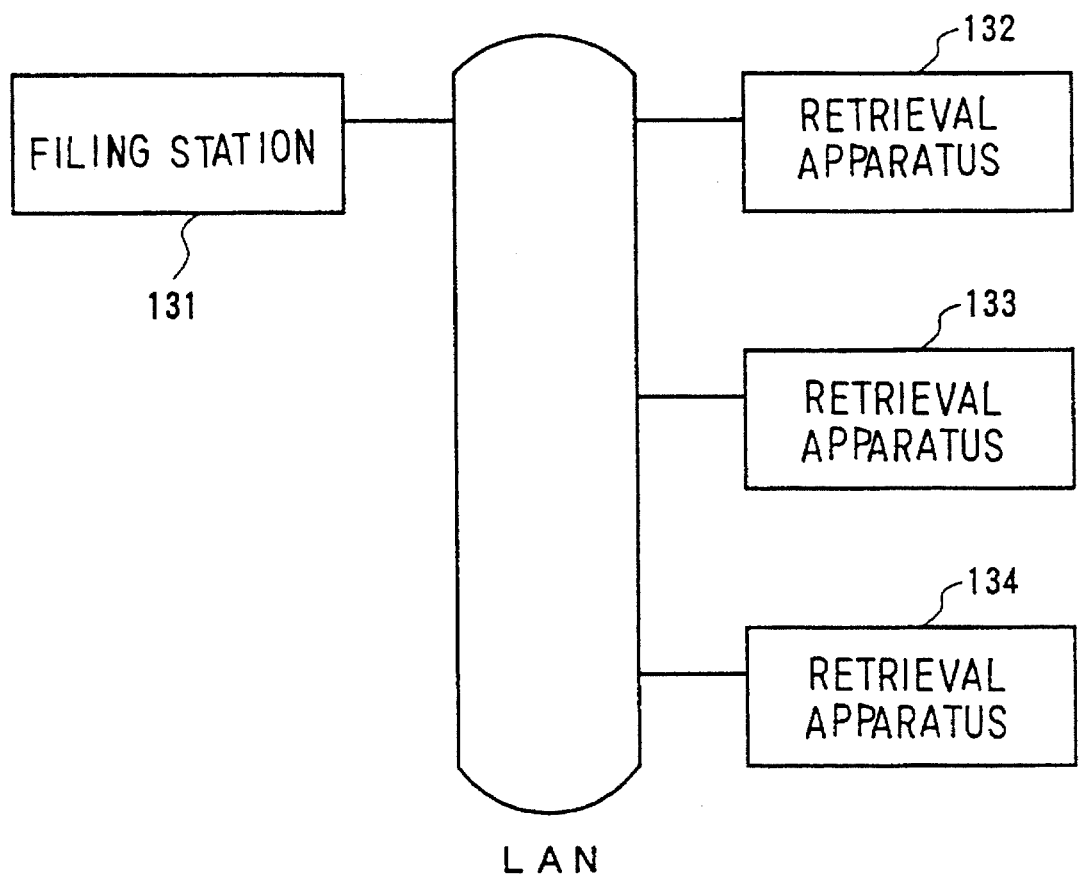
FIG. 18 is a block diagram showing the architecture of an electronic file system according to the second embodiment of the present invention.

FIG. 18 illustrates the architecture of the electronic file system in this embodiment.

As shown in the figure, the electronic file system of this embodiment is constituted by an electronic filing station 131 and a plurality of retrieval apparatuses 132, 133, 134 which are connected through a communication network such as LAN.

Figure 19:
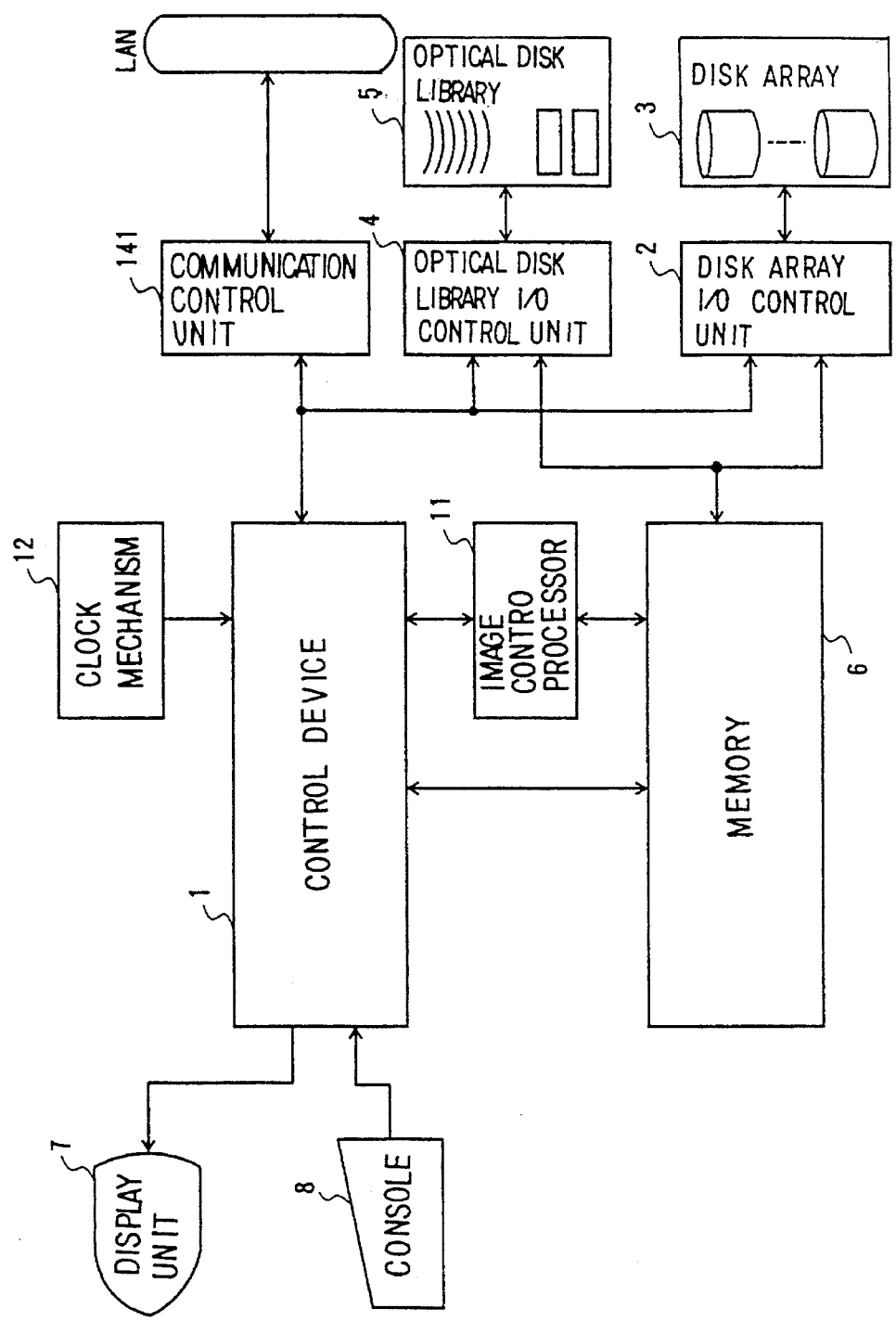
FIG. 19 is a block diagram showing the construction of an electronic file station according to the second embodiment of the present invention.

Here, the electronic filing station 131 in this embodiment has a construction as illustrated in FIG. 19.

As shown in the figure, the electronic filing station 131 in this embodiment is constructed substantially similarly to the electronic file equipment described before.

More specifically, likewise to the foregoing electronic file equipment, the electronic filing station 131 comprises a first control device 1, a disk array I/O control unit 2, a disk array 3, an optical disk library I/O control unit 4, an optical disk library 5, a memory 6, a display unit 7, a console 8, an image control processor 11 and a clock mechanism 12.

However, the electronic filing station 131 in this embodiment further comprises a communication control device 141 which governs input/output operations associated with the network.

Each of the retrieval apparatuses 132, 133 and 134 has a construction as illustrated in FIG. 20.

Referring to the figure, numeral 1 indicates a control device, numeral 6 a memory, numeral 7 a display unit, numeral 8 a console, numeral 11 an image control processor, and numeral 151 a communication control device.

In the foregoing electronic file equipment, the operation of reading image data out of the disk array 3 is effected under the control of that control device 1 of the electronic file equipment which has received the request from the console 8.

On the other hand, in the electronic file system of this embodiment, the operation of reading image data out of the disk array 3 proceeds as follows:

When requested to play back the image data from the console 8 of any of the retrieval apparatuses 132–134, the control device 1 of the retrieval apparatus controls the communication control unit 151 so as to transmit the request to the electronic filing station 131 through the LAN. The control device 1 of the electronic filing station 131 having received the request through the communication control unit 141 thereof retrieves the requested image data by the same process as in the foregoing electronic file equipment. Then, the desired image data is read out of the disk array 3 and is sent to the retrieval apparatus through the communication control unit 141 as well as the LAN. The retrieval apparatus receives the image data and displays it on the screen of the display unit 7.

Incidentally, each of the retrieval apparatuses may well be furnished with an external storage device in some intended uses. Further, it may well have the same construction as that of the foregoing electronic file equipment (refer to FIG. 1).

As set forth above, according to the present invention, it is possible to provide an electronic file equipment which can stock a large quantity of image information items with high reliability and in which the stocked image information items can be accessed at high speed.

What is claimed is:

1. An image filing system for stocking image data, comprising:
   (a) a library housing a plurality of image storage media for storing image data, said storage media being one of an optical disk and a record surface of an optical disk;
   (b) a disk array which stores a duplicate of all image data stored in at least one of said plurality of image storage media;
   (c) a control device which controls said library and said disk array;
   (d) a console which accepts instructions of an operator;
   (e) an image output device which outputs an image indicator by image data;

said library including notification means to notify, when a new image storage medium has been housed therein, said control device to that effect; and said control device including:
   (1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;
   (2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;
   (3) remaining capacity inspection means to inspect a remaining storage capacity of said disk array; and
   (4) registration decision means to decide when notified by said library, if image data stored in said image storage medium housed in said library anew can be registered into said disk array, on the basis of the remaining capacity inspected by said remaining capacity inspection means;

wherein said registration means performs, when said registration decision means has decided that said image data can be registered, the control of reading out said image data stored in said image storage medium housed anew, from said image storage medium housed anew, the generation of the information relating the read image data with said image storage medium housed anew, and the control of writing said read image data and the generated information into said disk array.

2. An image filing system for stocking image data, comprising:
   (a) a library housing a plurality of image storage media for storing image data, said storage media being one of an optical disk and a record surface of an optical disk;
   (b) a disk array which stores a duplicate of all image data stored in at least one of said plurality of image storage media;
   (c) a control device which controls said library and said disk array;
   (d) a console which accepts instructions of an operator;
   (e) an image output device which outputs an image indicator by image data; and
   (f) an image reading unit which reads an image and generates image data, wherein when said console has accepted the instruction of registering said image data generated by said image reading unit and a designation of the image storage medium for storing said image data to-be-registered, said registration means performs the generation of the information relating said image data generated by said image reading unit, with the designated image storage medium, and the control of writing said image data generated by said image reading unit and the generated information, into said disk array;

said control device including:
(1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;
(2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;
(3) backup subject image decision means for specifying image data stored in said disk array and not yet stored in said library, from among the image data registered in said disk array; and
(4) image data writing means to control writing image data into the specified image storage medium of said library, said image data writing means controlling the writing of said image data specified by said backup subject image decision means into said image storage medium with which the decided image data is related, on the basis of the relating information on said decided image data as is stored in said disk array.

3. An image filing system for stocking image data, comprising:
(a) a library housing a plurality of image storage media for storing image data, said storage media being one of an optical disk and a record surface of an optical disk;
(b) a disk array which stores a duplicate of all image data stored in at least one of said plurality of image storage media;
(c) a control device which controls said library and said disk array;
(d) a console which accepts instructions of an operator;
(e) an image output device which outputs an image indicator by image data;

said control device including:
(1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;
(2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;
(3) means to renew the image data stored in said disk array; and
(4) backup subject image decision means for specifying new image data renewed by the renewal means and not yet stored in said library, from among the image data stored in said disk array; and
(5) image data writing means controlling the writing of said image data specified by said backup subject image decision means, into said image storage medium with which the decided image data is related, on the basis of the relating information on said decided image data as stored in said disk array.

4. An image filing system for stocking image data, comprising:
(a) a library housing a plurality of image storage media for storing image data, said storage media being one of an optical disk and a record surface of an optical disk;
(b) a disk array which stores a duplicate of all image data stored in at least one of said plurality of image storage media;
(c) a control device which controls said library and said disk array;
(d) a console which accepts instructions of an operator;
(e) an image output device which outputs an image indicator by image data; and
(f) an image reading unit which reads an image and generates image data, wherein when said console has accepted the instruction of registering said image data generated by said image reading unit and a designation of the image storage medium for storing said image data to-be-registered, said registration means performs the generation of the information relating said image data generated by said image reading unit, with the designated image storage medium, and the control of writing said image data generated by said image reading unit and the generated information, into said disk array;

said control device including:
(1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;
(2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;

(3) backup subject image decision means to refer to the relating information items stored in said disk array and to decide for each image storage medium the number of image data items not yet stored in said library, from among the image data items in said disk array related with said image storage media; and (4) image data writing means to control writing image data into the specified image storage medium of said library, said image data writing means controlling the writing of at least those of said image data items in said disk array related with said image storage medium whose number of image data items not stored in said library has been decided as reaching at least a predetermined number by said backup subject image decision means, into said image storage medium with which said image data items are related.

5. An image filing system for stocking image data, comprising:

(a) a library housing a plurality of image storage media for storing image data, said storage media being one of an optical disk and a record surface of an optical disk;

(b) a disk array which stores a duplicate of all image data stored in at least one of said plurality of image storage media;

(c) a control device which controls said library and said disk array;

(d) a console which accepts instructions of an operator;

(e) an image output device which outputs an image indicator by image data;

said control device including:

(1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;

(2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;

(3) means to renew the image data stored in said disk array; and (4) backup subject image decision means to refer to the relating information items stored in said disk array and to decide for said each image storage medium the number of new image data items renewed by the renewal means and not yet stored in said library, from among the image data items in said disk array related with said image storage media; and (4) image data writing means to control writing image data into the specified image storage medium of said library, said image data writing means controlling the writing of at least those of said image data items in said disk array related with said image storage medium whose number of image data items not stored in said library has been decided as reaching at least a predetermined number by said backup subject image decision means, into said image storage medium with which said image data items are related.

6. An image filing system for stocking image data, comprising:

(a) a library housing a plurality of image storage media for storing image data, said storage media being one of an optical disk and a record surface of an optical disk;

(b) a disk array which stores a duplicate of all image data stored in at least one of said plurality of image storage media;

(c) a control device which controls said library and said disk array;

(d) a console which accepts instructions of an operator;

(e) an image output device which outputs an image indicator by image data;

said control device including:

(1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;

(2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;

(3) means for counting the number of times each of the image data items stored in said disk array is accessed;

(4) write-back subject medium decision means to refer to the relating information items stored in said disk array and to total the number of accesses to said image data items in said disk array related with said each image storage medium, and (5) image data writing means to control writing of image data into the specified image storage medium of said library, said image data writing means controlling the writing of at least some of said image data items in said disk array related with said image storage medium whose total number of times of access found by said write-back subject medium decision means has not reached a predetermined number, into said image storage medium with which said image data items are held in correspondence, and erasing said image data items related with said image storage medium whose total number of times of access has not reached said predetermined number, from said disk array after said writing into said image storage medium.

7. An image filing system for stocking image data, comprising:

(a) a library housing a plurality of image storage media for storing image data, said storage media being one of an optical disk and a record surface of an optical disk;

(b) a disk array which stores a duplicate of all image data stored in at least one of said plurality of image storage media;

(c) a control device which controls said library and said disk array;

(d) a console which accepts instructions of an operator;

(e) an image output device which outputs an image indicator by image data; and (f) an image reading unit which reads an image and generates image data, wherein when said console has accepted the instruction of registering said image data generated by said image reading unit and a designation of the image storage medium for storing said image data to-be-registered, said registration means performs the generation of the information relating said image data generated by said image reading unit, with the designated image storage medium, and the control of writing said image data generated by said image reading unit and the generated information, into said disk array;

said control device including:

(1) registration means to (i) control reading out all the image data stored in at least one of said image storage media housed in said library, (ii) control writing said image data read out of the image storage medium into said disk array, (iii) generate information relating the read image data with said image storage medium from which it has been read, and (iv) control writing the generated information into said disk array;

(2) playback control means to (i) perform when said console has accepted an instruction of playing back a specified image data of a specified image medium, (ii) control reading out said image data stored in said disk array and related with said specified image medium, on the basis of said information on the specified image data as stored in said disk array, and (iii) control outputting the image indicated by said image data read out of said disk array, through said image output device;

(3) means for counting the number of times each of the image data items stored in said disk array is accessed;

(4) write-back subject medium decision means to refer to the relating information items stored in said disk array and to total the number of accesses to said image data items in said disk array related with said each image storage medium, and (5) image data writing means to control writing of image data into the specified image storage medium of said library, said image data writing means controlling the writing of at least some of said image data items in said disk array related with said image storage medium whose total number of times of access found by said write-back subject medium decision means has not reached a predetermined number, into said image storage medium with which said image data items are held in correspondence, and erasing said image data items related with said image storage medium whose total number of times of access has not reached said predetermined number, from said disk array after said writing into said image storage medium.

* * * * *